United States Patent [19]

Oikawa

[11] Patent Number: 4,858,080
[45] Date of Patent: Aug. 15, 1989

[54] HEADLIGHT MOVING APPARATUS FOR AUTOMOTIVE VEHICLE

[75] Inventor: Takahiro Oikawa, Susono, Japan
[73] Assignee: Yazaki Corporation, Japan
[21] Appl. No.: 165,795
[22] Filed: Mar. 9, 1988
[51] Int. Cl.[4] .............................................. B60Q 1/08
[52] U.S. Cl. ....................................... 362/61; 362/66; 362/71; 362/420; 362/428
[58] Field of Search ................... 362/71, 43, 37, 44, 362/42, 61, 66, 418, 419, 420, 427, 428; 73/517 AV

[56] References Cited

U.S. PATENT DOCUMENTS

| 4,712,427 | 12/1987 | Peters | 73/517 AV |
| 4,761,743 | 8/1988 | Wittke | 73/517 AV |

FOREIGN PATENT DOCUMENTS

| 2450777 | 10/1974 | Fed. Rep. of Germany | 362/44 |
| 3129891 | 9/1982 | Fed. Rep. of Germany | 362/66 |
| 0139664 | 8/1982 | Japan | 73/517 AV |
| 0174855 | 10/1983 | Japan | 73/517 AV |
| 0178666 | 8/1986 | Japan | 73/517 AV |
| 0178667 | 8/1986 | Japan | 73/517 AV |

Primary Examiner—Ira S. Lazarus
Assistant Examiner—Sue Hagarman
Attorney, Agent, or Firm—Wigman & Cohen

[57] ABSTRACT

The headlight moving apparatus comprises a yaw rate sensor, a headlight position sensor, a vehicle speed sensor, a CPU, and a headlight actuator. The CPU calculates an appropriate headlight turning position on the basis of these three sensor signals. Since the yaw rate sensor can directly detect the vehicle turning motion and direction, it is possible to move the headlights right and left more reliably. Therefore, the adjusted headlights can brighten remote forward road surface when the vehicle runs along a curved road.

3 Claims, 5 Drawing Sheets

HEADLIGHT MOVING APPARATUS FOR AUTOMOTIVE VEHICLE

BACKGROUND OF THE INVENTION

1. Field of the Invention

The present invention relates generally to a headlight moving apparatus, and more specifically to an apparatus for adjustably swinging the headlights for an automotive vehicle according to vehicle turning direction so that the headlight can brighten the forward road surface, in particular, when the vehicle runs along a curved road.

2. Description of the Prior Art

In general, headlights are fixedly mounted on the front end of an automotive vehicle body. As far as the vehicle is running along a straight road, no problem arises, as shown in FIG. 1A. However, when the vehicle is running along a curved road, the headlights cannot appropriately brighten the forward road surface also as shown in FIG. 1A.

To overcome this problem, there has been proposed an apparatus which can swing the headlights right and left on the basis of angular positions of the steering wheel. In this apparatus, since the headlight is turned to the left or the right in accordance with the turning direction of the steering wheel, this apparatus is convenient to a certain extent.

In the prior art headlight moving apparatus as described above; however, since the vehicle turning direction is indirectly detected on the basis of the angular position of the steering wheel, when the driver rotates the steering wheel in the reverse direction to correct an excessive vehicle turning motion after the vehicle has almost turned a curved road, the vehicle running direction does not necessarily match the steering wheel angular position, thus resulting in a problem in that the headlights cannot appropriately brighten the forward road surface toward which the vehicle runs, as shown by solid lines in FIG. 1B. In other words, the prior art headlight moving apparatus involves a problem in that the headlight position is subjected to various factors such as the degree of driver's driving skill, vehicle speed, road surface conditions, vehicle characteristics, etc. This is because the vehicle running conditions are not direclty detected but detected indirectly on the basis of the angular position of the steering wheel.

SUMMARY OF THE INVENTION

With these problems in mind, therefore, it is the primary object of the present invention tp provide a headlight moving apparatus for an automotive vehicle which can move the headlights to an appropriate position on the basis of directly detected vehicle running conditions.

To achieve the above-mentioned object, a headlight moving apparatus for an automotive vehicle provided with at least one headlight, according to the present invention, comprises: (a) means for detecting yaw rate of the automotive vehicle; (b) means for detecting vehicle speed; (c) means for detecting headlight position; (d) means, coupled to said vehicle yaw rate detecting means, vehicle speed detecting means and headlight position detecting means, for generating a headlight actuating signal indicative of an appropriate headlight turning position on the basis of the detected yaw rate, vehicle speed, and headlight position; and (e) means, coupled to said signal generating means, for actuating the headlight in response to the generated headlight actuating signal.

The yaw rate detecting means is a vibrational angular rate sensor. Further, the headlight is moved at a speed proportional to the detected vehicle speed.

BRIEF DESCRIPTION OF THE DRAWINGS

The features and advantages of the headlight moving apparatus according to the present invention will be more clearly appreciated from the following description taken in conjunction with the accompanying drawings in which like reference numerals designate the same or similar elements and in which.

DETAILED DESCRIPTION OF THE PREFERRED EMBODIMENTS

Figure 1A:
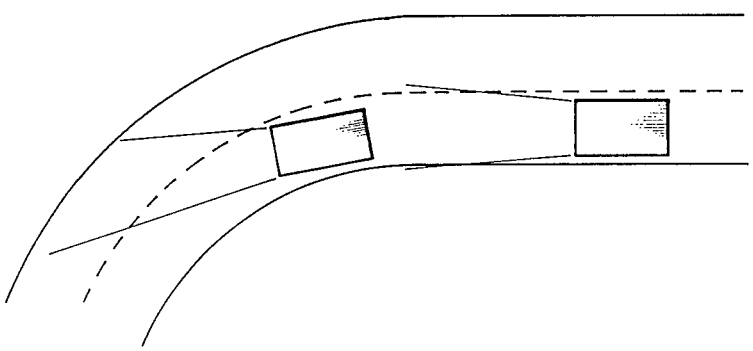
FIG. 1A is an illustration for assistance in explaining a problem involved in the prior-art apparatus.
Figure 1B:
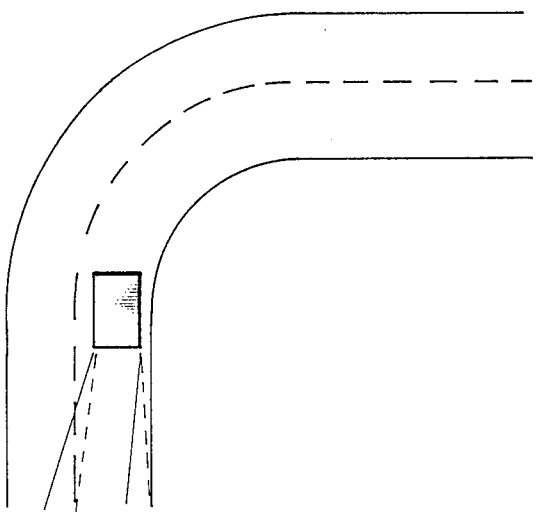
FIG. 1B is an illustration for assistance in explaining another problem involved in the prior-art apparatus.
Figure 2:
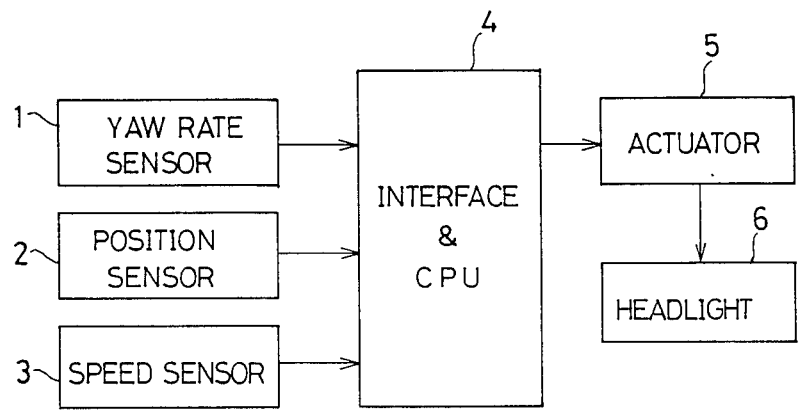
FIG. 2 is a block diagram an embodiment of the headlight moving apparatus of the present invention.

An embodiment of the present invention will be described with reference to the attached drawings. In FIG. 2, the headlight moving apparatus of the present invention comprises a yaw rate sensor 1 for detecting an angular rate (velocity) applied to the vehicle in the right or left direction; a headlight position sensor (e.g. proportion meter) 2 for detecting an angular position of the headlight; a vehicle speed sensor 3 of mechanical or electrical type; an interface and CPU 4 for calculating an appropriate headlight angular position on the basis of signals detected by the yaw rate sensor 1, the position sensor 2 and the vehicle speed sensor 3 and inputted thereto via the interface in accordance with predetermined programs to generate a headlight actuating signal; an actuator 5 for actuating a headlight to be calculated headlight angular position in response to the generated headlight actuating signal. That is, the actuator 5 drives the headlight 6 in response to the control signal generated from the CPU 4 to adjust the direction of the headlight 6. The actuator 5 is a motor, step motor, solenoid, etc., for instance to move the headlight in response to a single or plural pulse signals.

Figure 3:
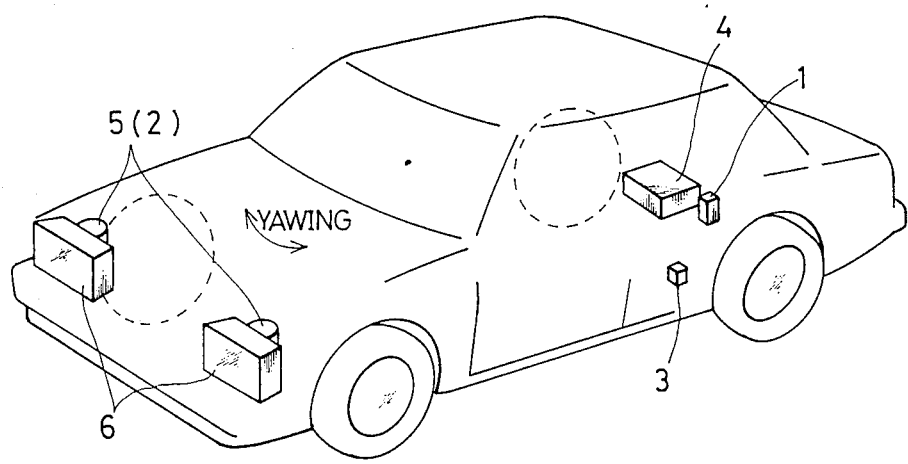
FIG. 3 is a perspective view showing an arrangement of the headlight moving apparatus shown in FIG. 2.

FIG. 3 shows an example of arrangement of the headlight moving apparatus mounted on an automotive vehicle. The two headlights 6 are mounted near both the front end sides of the vehicle and driven to the right and left by the two actuators 5. The position sensor 2 is provided for each actuator 5 to detect an angular position of the moved headlight. In the embodiment shown in FIG. 3, an actuator 5 and a position sensor 2 are provided for each headlight 6. However, without being limited thereto, it is also possible to drive the two headlights by a single actuator 5 including a single position sensor 3 by means of a linkage mechanism. The yaw rate sensor 1 can be mounted at any position at which vehicle turning motion can be detected. The vehicle speed sensor 3 can also be mounted at any appropriate position such as a rear wheel shaft, for instance.

As the above-mentioned yaw rate sensor 1, a vibrational angular rate sensor is used, for instance. In this vibrational sensor, square pillar shaped vibrator is so supported as to be vibrated freely, and a displacement generated in the vibrator due to Coriolis force is transduced into electrical signals indicative of angular rates (velocity) applied thereto.

Figure 4A:
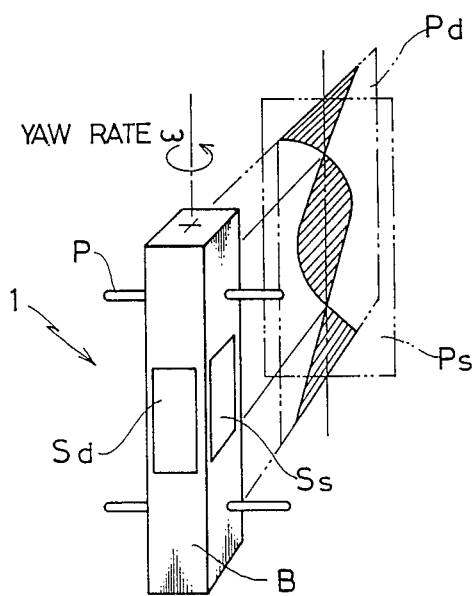
FIG. 4A is a perspective view showing a vibrational angular rate sensor incorporated in the apparatus of the present invention.

The vibrational angular rate sensor will be described in more detail with reference to the attached drawing. In FIG. 4A, the vibrator (beam) B is supported by two pins P, and driven by two driving surfaces $S_d$ (made of piezoelectric ceramic) and sensed by two sensing surfaces $S_s$ (also made of piezoelectric ceramic). Further, in FIG. 4A, $P_d$ denotes a driving plane, $P_S$ denotes a sensing plane, the hatched portion denotes a distribution of beam vibration, and w denotes an angular velocity applied to the sensor.

The sensor can detect an angular rate (velocity) w of rotation on the basis of Coriolis force. Therefore, an angle can be detected by integrating the angular velocity w as follows:

$$\theta = \int \omega dt.$$

Figure 4B:
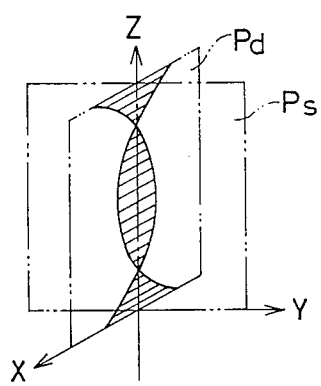
FIG. 4B is an illustration showing the fundamental vibration distribution of the sensor when no external angular velocity is applied thereto.
Figure 4C:
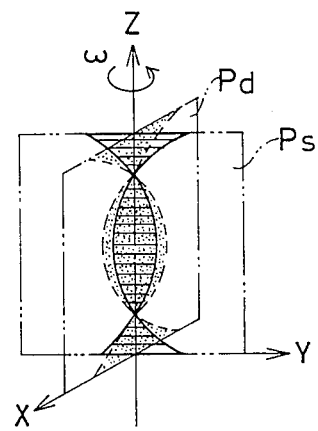
FIG. 4C is an illustration showing the fundamental vibration distribution of the sensor when an angular velocity is applied thereto.

The beam B vibrates in the transverse vibration mode of approximately 3.3 kHz, for instance. The support pins support the beam at nodal points of the fundamental beam vibration. When the rate sensor is rotated at the angular velocity $\omega$ around the Z axis with the rate sensor vibrated in the X direction as shown in FIG. 4B, a vibration in the Y direction is induced by a Coriolis force due to rotation as shown in FIG. 4C. Therefore, it is possible to detect the Coriolis force indicative of angular velocity as electric signals detected between the piezoelectric ceramic sensing surfaces $P_S$.

Figure 5:
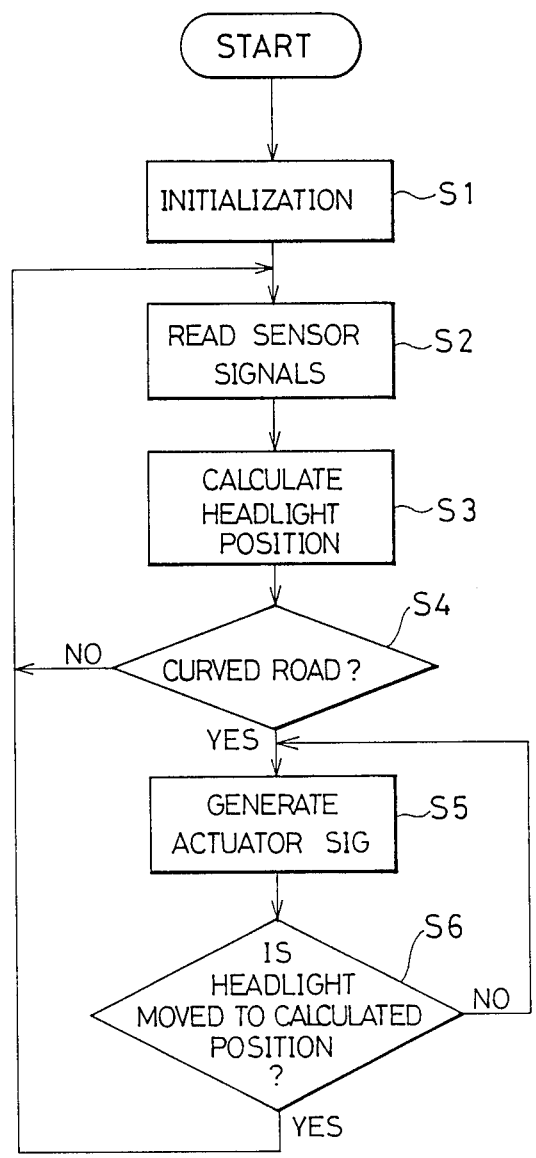
FIG. 5 is a flowchart for assistance in explaining the operation of the CPU shown in FIG. 2.

FIG. 5 shows a flowchart executed by the CPU 4 in accordance with a predetermined program. The program starts when an ignition switch is turned on, for instance, and initializes all the sensor signals (in step S1). Control first reads sensor signals of the yaw rate sensor 1 (indicative of the vehicle turning velocity), the headlight position sensor 2, and the vehicle speed (in step S2). These data are once stored in the CPU 4. On the basis of the read sensor signals, the CPU 4 calculates an instantaneous vehicle turning angle and then an appropriate headlight position on the basis of the detected angle (in step S3). Control checks whether the vehicle is running along a curved road or not on the basis of the data detected by the yaw rate sensor 1 (stored in an internal memory of the CPU 4) (in step S4). If NO, control returns to the step S2. If YES, control generates an actuator signal indicative of an appropriate headlight position value calculated in step S3. In response to this actuator signal, the actuator 5 drives the headlight 6 to the calculated position. The headlight position is detected by the position sensor 2. Control checks whether the current headlight position reaches the calculated position (in step S6). If YES control returns to step S2 to detect the succeeding sensor signals because the headlight 6 has been moved to an appropriate position. However, if NO (in step S6), control continues to generate the actuator signal to the actuator 5 (in step S5). In the above operation, the position sensor 2 serves to supply a feedback signal to the CPU 4.

Further, in the above construction, it is preferable to change headlight moving speed according to vehicle speed in order to smoothly move the headlight to the right or left when the vehicle is running along a curved road. For doing this, the actuator 5 is so designed that headlight moving speed is proportional to the voltage level of the actuator signal generated from the CPU 4. Further, the voltage level of the actuator signal is determined by the CPU so as to be proportional to the vehicle speed. In this case, it is preferable that the voltage level of the actuator signal is proportional to the vehicle speed, and the voltage duration (pulse width or the number of pulses) of the actuator signal is proportional to the vehicle turning angle detected by the yaw rate sensor 1.

Figure 6:
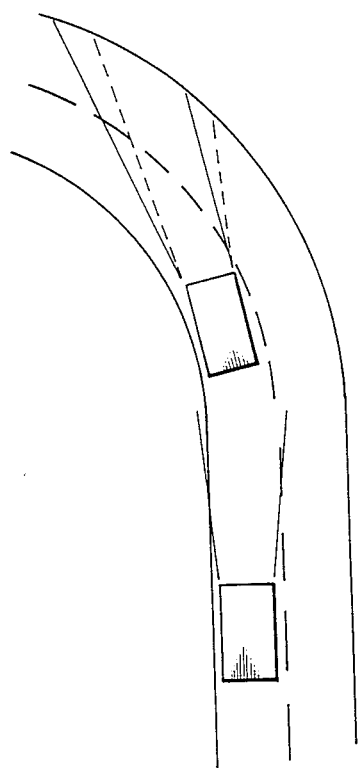
FIG. 6 is an illustration for assistance in explaining the operation of the appartus of the present invention.

FIG. 6 shows the effect of the apparatus of the present invention. In FIG. 6, the dashed lines show the forward headlight illumination area obtained when the headlight is fixed, and the solid lines show the forward headlight illumination area obtained when the headlight is adjustably moved to the left by the apparatus of the present invention during vehicle's running along a curved road.

As described above, in the headlight moving apparatus of the present invention, since the vehicle turning direction can directly be detected by the yaw rate sensor, without being dependent upon angular positions of the steering wheel, it is possible to increase the variability of headlight moving operation as compared with the prior-art apparatus. For instance, when a driver turns the steering handle in the direction opposite to that the vehicle turns along a sharp road corner; that is, even if the direction of the steering wheel rotational direction does not match the vehicle turning movement, the yaw rate sensor can reliably detect the true vehicle turning motion and the movement direction. Therefore, it is possible to reliably move the headlights to the right and left when the vehicle is running along a curved road. As a result, the driver can see a more remote forward road surface along a curved road and drive the vehicle more safely.

What is claimed is:

1. A headlight moving apparatus for an automotive vehicle provided with at least one headlight, which comprises:
   (a) vibrational angular rate sensor means for detecting yaw rate of the automotive vehicle;
   (b) means for detecting vehicle speed;
   (c) means for detecting headlight position;
   (d) means, coupled to said vibrational angular rate sensor means, vehicle speed detecting means, and headlight position detecting means, for generating a headlight actuating signal indicative of an appropriate headlight turning position on the basis of the detected yaw rate, vehicle speed, and headlight position; and
   (e) means, coupled to said signal generating means, for actuating the headlight in response to the generated headlight actuating signal.

2. The headlight moving apparatus for an automotive vehicle as set forth in claim 1, wherein said headlight actuating signal generating means generates a headlight actuating signal to actuate the headlight to an angular position proportional to the detected vehicle turning angle.

3. The headlight moving apparatus for an automotive vehicle as set forth in claim 1, wherein said headlight actuating signal generating means generates a headlight actuating signal to actuate the headlight at a speed proportional to the detected vehicle speed.

* * * * *